(12) United States Patent
Goebels et al.

(10) Patent No.: US 7,577,509 B2
(45) Date of Patent: *Aug. 18, 2009

(54) CONTROL MODULE FOR SINGLE 3/2 SOLENOID CONTROLLED RELAY VALVE

(75) Inventors: Hermann J. Goebels, Sheffield Village, OH (US); Christopher M. Knaack, Bay Village, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/179,968

(22) Filed: Jul. 25, 2008

(65) Prior Publication Data

US 2008/0288151 A1    Nov. 20, 2008

Related U.S. Application Data

(63) Continuation of application No. 10/850,720, filed on May 21, 2004, now Pat. No. 7,415,341, which is a continuation-in-part of application No. 10/745,126, filed on Dec. 23, 2003, now Pat. No. 7,020,551.

(51) Int. Cl.
    *B60T 8/32* (2006.01)
(52) U.S. Cl. .............. 701/78; 701/83; 701/91; 701/38; 303/118.1; 303/113.2
(58) Field of Classification Search ............ 701/78, 701/83, 91, 38, 72, 71; 303/113.1–119.2; 280/5.502, 5.507
See application file for complete search history.

(56) References Cited

U.S. PATENT DOCUMENTS

| | | |
|---|---|---|
| 3,837,710 A | 9/1974 | Reinecke et al. |
| 4,611,859 A | 9/1986 | Otsuki et al. |
| 5,071,200 A | 12/1991 | McNinch, Jr. |
| 5,171,069 A | 12/1992 | Peck et al. |
| 5,462,342 A | 10/1995 | Goebels |
| 6,050,654 A | 4/2000 | Gegalski et al. |
| 6,123,396 A | 9/2000 | Siegel |
| 6,371,573 B1 | 4/2002 | Goebels et al. |

(Continued)

FOREIGN PATENT DOCUMENTS

DE    10129605    1/2003

(Continued)

OTHER PUBLICATIONS

International Search Report from PCT/US 2005/017191.

(Continued)

*Primary Examiner*—Richard M. Camby
(74) *Attorney, Agent, or Firm*—Eugene E. Clair; Cheryl L. Greenly

(57) ABSTRACT

In one embodiment, a vehicle braking system, for delivering pressurized air to a brake chamber to achieve a desired braking response, includes an air-pressure controlled relay valve for delivering the pressurized air to the brake chamber. A solenoid receives a variable control input pressure and delivers the control input pressure to the relay valve as a function of a state of the solenoid. An ECU controls the solenoid according to a control model for delivering the pressurized air to the brake chamber and achieving the desired braking response.

18 Claims, 4 Drawing Sheets

U.S. PATENT DOCUMENTS

| | | |
|---|---|---|
| 6,553,284 B2 | 4/2003 | Holst et al. |
| 7,020,551 B2 | 3/2006 | Goebels et al. |
| 7,234,785 B1 * | 6/2007 | McCann et al. ............... 303/89 |
| 2003/0225499 A1 | 12/2003 | Holler |
| 2005/0137773 A1 | 6/2005 | Goebels et al. |

FOREIGN PATENT DOCUMENTS

| | | |
|---|---|---|
| DE | 10149918 C1 | 5/2003 |
| EP | 0816195 B1 | 4/1997 |
| WO | 01/10692 | 2/2001 |
| WO | 01/96159 A1 | 12/2001 |
| WO | 03/033321 A1 | 4/2003 |

OTHER PUBLICATIONS

Office Action from Chinese Application No. 200480038526, dated Sep. 7, 2007.

* cited by examiner

US 7,577,509 B2

CONTROL MODULE FOR SINGLE 3/2 SOLENOID CONTROLLED RELAY VALVE

This application is a continuation of U.S. application Ser. No. 10/850,720 "Control Module for Single 3/2 Solenoid Controlled Relay Valve" filed May 21, 2004, now U.S. Pat. No. 7,415,341, which was a continuation-in-part of Ser. No. 10/745,126, U.S. Pat. No. 7,020,551 "Roll Stability Control System," filed Dec. 23, 2003, both of which are fully incorporated herein by reference.

BACKGROUND

The present invention relates to electronically controlled pressure systems. It finds particular application in conjunction with control models for controlling pressure in pneumatically operated vehicles systems and will be described with particular reference thereto. It will be appreciated, however, that the invention is also amenable to other applications.

Electronic controlled brake systems (ECBS or EBS), antilock braking systems (ABS), and automatic traction control (ATC) systems are incorporated into vehicles to improve braking performance and vehicle handling. EBS permits perpetual optimal balancing of braking forces among individual wheel brakes and for achieving optimal stability and braking performance during all driving and braking situations. Proportional-solenoid or multiple-solenoid controlled valves are used for distributing and modulating desired pressure to the individual wheels as processed and controlled by an electronic control unit (ECU). The ECU receives sensor input signals from, for example, the driver's brake pedal demand, the speed of individual wheel(s), along with control and brake chamber pressures.

The brake pressures calculated by the ECU for the individual wheels must be delivered to the respective wheels with a high accuracy and, furthermore, must be delivered and adjusted very quickly. Therefore, pressure modulator relay valves are used in air-braked systems to achieve quick pressure apply and release times. Also, additional pressure sensors are used to achieve desired pressure accuracies.

A modular relay valve (MRV) operates as a remote controlled brake valve for delivering or releasing air to brake chambers in response to control air that is delivered from the driver's operated brake valve or other sources. The relay valve applies, holds, or releases a brake chamber's pressure in proportion to the control pressure, which is controlled as a function of the driver's brake pedal demand.

ABS and ATC as integrated in EBS prevents wheel lock-ups during braking and excessive wheel spinning during accelerating in order to provide vehicle stability and braking and traction performance.

MRVs used in conjunction with EBS typically include three (3) solenoids for controlling the air pressure. A backup solenoid (electrically) provides supply pressures from an air reservoir; a hold solenoid maintains air pressure; and a release solenoid removes or exhausts air pressure. An MRV used in conjunction with EBS may only include a single solenoid, which is designed as a pressure/current proportional solenoid.

A proportional solenoid converts a control current, which is determined by an algorithm in the ECU, into a proportional control pressure for the relay valve. One advantage of controlling pressure with a proportional solenoid is the possibility of providing and controlling different pressure curves and pressure modulations as a function of the control current supplied to the solenoid. However, proportional solenoids are more complex and expensive and, furthermore, require the ECU to supply a current controlled output stage that acts as the control current.

SUMMARY

In one embodiment, a vehicle braking system, for delivering pressurized air to a brake chamber to achieve a desired braking response, includes an air-pressure controlled relay valve for delivering the pressurized air to the brake chamber. A solenoid receives a variable control input pressure and delivers the control input pressure to the relay valve as a function of a state of the solenoid. An ECU controls the solenoid according to a control model for delivering the pressurized air to the brake chamber and achieving the desired braking response.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
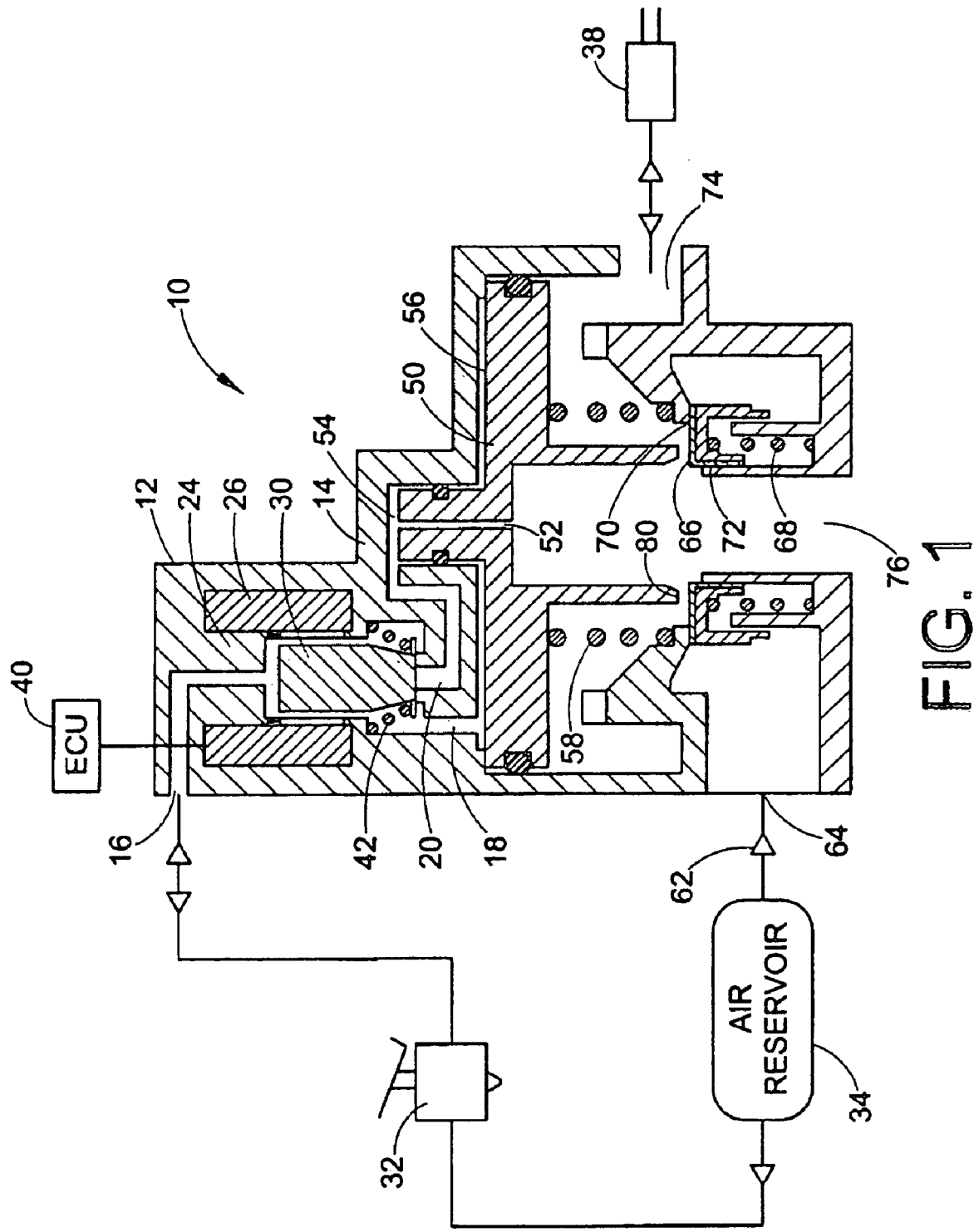
FIG. 1 illustrates a brake circuit incorporating a solenoid used in conjunction with a control model in one embodiment of the present invention.

With reference to FIG. 1, a solenoid controlled relay valve 10 is used for controlling air pressure delivered to a system (e.g., an ABS control) in conjunction with a control model in one embodiment of the present invention. The relay valve 10 includes a solenoid valve section 12 and a relay valve section 14.

In one embodiment, the solenoid valve section 12 includes a single 3/2-solenoid valve; however, other types of solenoid valves are also contemplated. The illustrated 3/2-solenoid valve includes three (3) pneumatic ports (connections) 16, 18, 20 and a switching means 24. The port 16 is a solenoid valve inlet (control) port; the port 18 is a solenoid valve outlet (delivery) port; and the port 20 is a solenoid valve exhaust (vent) port. The illustrated switching means 24 is a solenoid switching device including a coil 26, which is capable of carrying an electric current, and a magnetic core 30.

The control port 16 fluidly communicates with a brake valve (brake pedal) 32 operated by a vehicle operator. The brake valve 32 also fluidly communicates with a reservoir 34 storing pressurized fluid (e.g., air). The relay valve 14 transmits the pressurized fluid from the reservoir 34 to a brake chamber (pressure actuator) 38 for controlling a service brake (not shown) used for decelerating a wheel. An electronic control unit (ECU) 40 monitors a speed of the wheel and at least one other wheel (not shown). As described in more detail below, the pressurized fluid is transmitted from the reservoir 34 to the brake chamber 38 as a function of how much pressure the vehicle operator applies to the brake valve 32 and electrical signals transmitted from the ECU 40 to the switching means 24 as a function of the speed of the wheel.

A spring 42 biases the core 30 in a first position (as illustrated in FIG. 1). Therefore, when no electric current is passing through the coil 26, the core 30 is in the first position, which is referred to as a deenergized position. While in the deenergized position, the core 30 sealingly covers the exhaust port 20 for preventing pressurized air from passing from the solenoid valve 12 to atmosphere. Passing sufficient electrical current through the coil 26 causes the core 30 to overcome the bias of the spring 42 and, furthermore, causes the core 30 to move to a second position, which is referred to as an energized position. While in the energized position, the core 30 sealingly covers the control port 16, but no longer sealingly covers the exhaust port 20.

The relay valve section 14 includes a relay piston 50 including an exhaust passage 52 that fluidly communicates with the solenoid valve exhaust port 20 and a relay valve exhaust port 54. A control side 56 of the piston 50 fluidly communicates with the delivery port 18 of the solenoid valve section 12. A relay spring 58 biases the relay piston 50 in a raised position (as illustrated in FIG. 1). Pressurized fluid from the reservoir 34 is fluidly communicated to a relay valve supply port 64. A pressurized fluid seal 66 is biased by a spring 68 to sealingly engage points 70, 72 of the relay valve section 14 for preventing the pressurized fluid communicated from the reservoir 34 from escaping.

A relay valve delivery port 74 fluidly communicates with the brake chamber 38. Furthermore, when the piston 50 is in the raised position (as illustrated in FIG. 1), the brake chamber 38 fluidly communicates with a relay valve exhaust port 76. Therefore, while in the raised position shown in FIG. 1, the relay piston 50 is referred to as being in the exhaust position.

As the piston 50 moves in a downward direction, a bottom point 80 of the piston 50 sealingly engages a top portion of the pressurized fluid seal 66 for creating a seal between the brake chamber 38 and the relay valve section 14 exhaust port 76. Furthermore, as the relay piston continues to move downward, the bias of the storage volume spring 68 is overcome and the pressurized fluid seal 66 also begins to move in a downward direction. As the pressurized fluid seal 66 moves downward, the seal at the point 70 is broken. As described in more detail below, the position and movement of the piston 50 is controlled as a function of the pressure on the control side 56 of the piston 50 and in the delivery port 18 of the solenoid valve section 12.

Once the seal at the point 70 is broken, the brake chamber 38 fluidly communicates with the fluid storage volume 60 as a function of a size of an opening between the point 70 and the pressurized fluid seal 66. Therefore, a pressure in the brake chamber 38 is determined as a function of the pressure of the pressurized fluid and the size of the opening between the point 70 and the pressurized fluid seal 66.

As discussed above, the position and movement of the piston 50 is controlled as a function of the pressure on the control side 56 of the piston 50 and in the delivery port 18 of the solenoid valve section 12. More specifically, pressurized air is delivered from the air reservoir 34 to the solenoid valve control port 16 as a function of a position of the brake valve 32. The position of the brake valve 32 is controlled by the vehicle operator. For example, when it is desired to apply the service brakes, the operator depresses the brake valve 32. Furthermore, the desired level of service braking pressure applied is proportional to an amount the brake valve 32 is depressed.

During normal braking conditions, the ECU 40 causes the core 30 to be maintained in the deenergized position. When the core 30 is in the deenergized position, the pressurized fluid is transmitted between the air reservoir 34 and the control side 56 of the piston 50 via the solenoid valve control port 16 as a function of the amount the brake valve is depressed. Once enough pressure builds on the control side 56 of the piston 50 to overcome the force of the relay spring 58, the piston 50 begins to move downward. Furthermore, an amount the piston 50 moves downward is proportional to the amount of pressure on the control side 56 of the piston 50. As discussed above, once enough pressure builds on the control side 56 of the piston 50, the piston 50 is moved downward enough to contact and move the pressurized fluid seal 66 for causing the brake chamber 38 to communicate with the pressurized fluid as a function of a size of the opening between the point 70 and the pressurized fluid seal 66. As the brake valve is released, the pressurized fluid is released from the control side 56 of the piston 50 via the solenoid valve control port 16.

When it is desired to control the pressurized air delivered to the brake chamber 38 in a manner that is not proportional to an amount the brake valve 32 is depressed (e.g., when a control system such as an anti-lock braking system (ABS) is activated), delivery of the control pressure to the relay valve 14 is regulated by actuation and deactuation of the solenoid 24. The ECU 40 controls the actuation and deactuation of the solenoid 24 according to a predetermined model. In one embodiment, the model is stored internally in the ECU 40 and calls for the solenoid 24 to be alternately actuated and deactuated.

Figure 2:
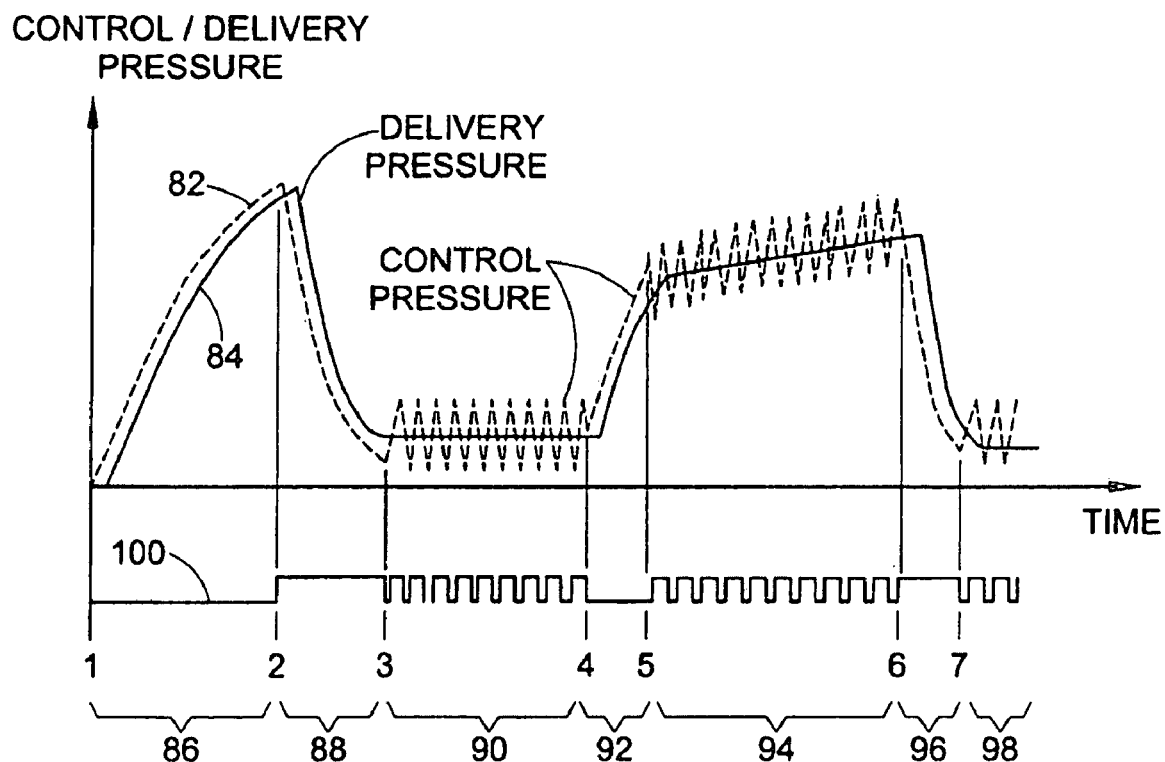
FIG. 2 illustrates a characteristic ABS pressure cycle of a single 3/2-solenoid operated relay valve when controlled by a control model in one embodiment of the present invention.

With reference to FIGS. 1 and 2, a first timing diagram (curve) 82 of a control pressure delivered to the control side 56 of the relay piston 50, when the solenoid is operated according to the control model in one embodiment of the present invention, is illustrated. A second timing diagram (curve) 84 illustrates pressure delivered from the relay valve delivery port 74 to the actuator 38, when the solenoid is operated according to the control model. The (delivery) pressure cycle 84 in the control model according to one embodiment of the present invention includes a first pressure apply time period 86, a first pressure release time period 88, a first steady pressure hold time period 90, a second pressure apply time period 92, an increasing pressure hold time period 94, a second pressure release time period 96, and a second steady pressure hold time period 98. A third timing diagram (curve) 100 depicts activation and deactivation (deenergized) of the solenoid 24 during the various time periods 86, 88, 90, 92, 94, 96, 98.

In one embodiment, the control model is stored in the ECU 40 and is designed for controlling the solenoid 24 and the actuator 38 during an ABS event. However, it is to be understood that other control models, for producing other timing diagrams and delivering pressurized air for other purposes, are also contemplated.

Figure 6:
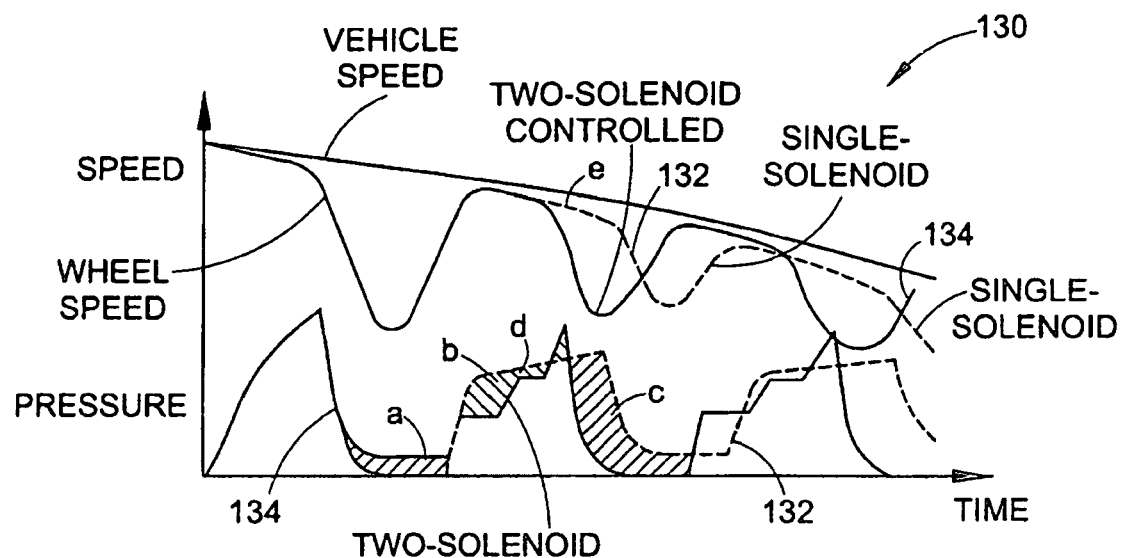
FIG. 6 illustrates a characteristic wheel speed loop of an ABS controlled wheel in an ABS event and the reacting brake pressure behavior when controlled with a single 3/2-solenoid relay valve in one embodiment of the present invention compared with a prior art system.

For simplicity, the appropriate wheel speed of the ABS controlled wheel is not shown. However, it is to be understood that there is a correlation between wheel speed and the pressure periods described above. Brake pressure is released in the appropriated brake actuator (chamber) when the controlled wheel is over braked and tends to lock. Brake pressure is held when the speed of the wheel is recovering from the locking tendency. If the wheel recovers and is close to the vehicle speed, the brake pressure builds up again to achieve the optimal brake performance and stability of the wheel. FIG. 6, which is described in more detail below, illustrates a wheel speed and a corresponding reaction brake pressure.

During an event when the solenoid is operated according to the control model, the ECU 40 deenergizes the solenoid 24 during the first time period 86 and, therefore, the control port 16 is open. The control pressure, which is regulated as a function of how much pressure the driver applies to the brake valve 32, builds-up through the open control port 16 and passes to the control side 56 of the relay valve piston 50. When the pressure on the control side 56 of the relay valve 14 exerts a force great enough to overcome the bias created by the spring 58, the relay piston 50 begins moving downward. If the pressure on the control side 56 of the relay valve 14 is great enough to move the relay piston 50 such that the point 80 sealingly engages and moves the seal 66 downward, supply pressure passes from the storage volume 34 to the brake chamber 38 as a function of the size of the opening. Therefore, the pressure in the brake chamber 38 is proportional to the pressure at the control port 16 of the solenoid valve. It is to be understood that there is a time delay between changes in the pressure at the control port 16 and a corresponding change in pressure at the delivery port 74 of the relay valve 14. The time delay is due to hysteresis of the relay valve.

During the time period 88, the switching means 24 is energized. Therefore, the pressure on the control side 56 of the piston 50 is exhausted via the passage 52.

During the time period 90, a pressure hold phase is required and the solenoid 24 is alternately energized and deenergized by the ECU 40 according to the internally stored control model. By alternating activation of the solenoid 24 between build and exhaust phases at a given duty cycle, a pulsated up and down control pressure is built on the control side 56 of the piston 50. But due to the hysteresis and slow response of the piston 50, the resulting position of the piston 50 is determined as the average of the modulated pressure on the control side 56 of the piston. In this sense, the modulated pressure on the control side of the piston 50 is quasi-filtered and leveled by the hysteresis and, furthermore, the resulting brake chamber 38 pressure is proportional to the average pressure (without any overshot) on the control side 56. To achieve a hold phase (e.g., during the time period 90), the frequency and the percentages of the duty cycle ratio of the alternating energizing and deenergizing of the solenoid 24 are constant.

During the time period 92, the solenoid 24 is deenergized and delivery pressure builds up in a similar manner as during the time period 86.

During the time period 94, the ECU 40 again alternately energizes and deenergizes the solenoid to obtain a similar reaction and response as described above for time period 90. Although the frequency of the alternating activation of the solenoid 24 is the same as in the time period 90, the duty cycle ratio is slowly changed (e.g., decreased) by the ECU 40 during the time period 94. Decreasing the duty cycle ratio by a constant frequency means changing the ratio of energized to deenergized time in that way that a higher average of the pressure on the control side 56 is achieved. Consequently, the pressure at the delivery port 74 increases in a proportional manner.

During the time period 96, the solenoid 24 is energized for resulting in a similar decline in the pressure at the delivery port 74 as achieved in the time period 88.

During the time period 98, the solenoid 24 is energized and deenergized for resulting in a similar hold in the pressure at the delivery port 74 as achieved in the time period 90.

Figure 3:
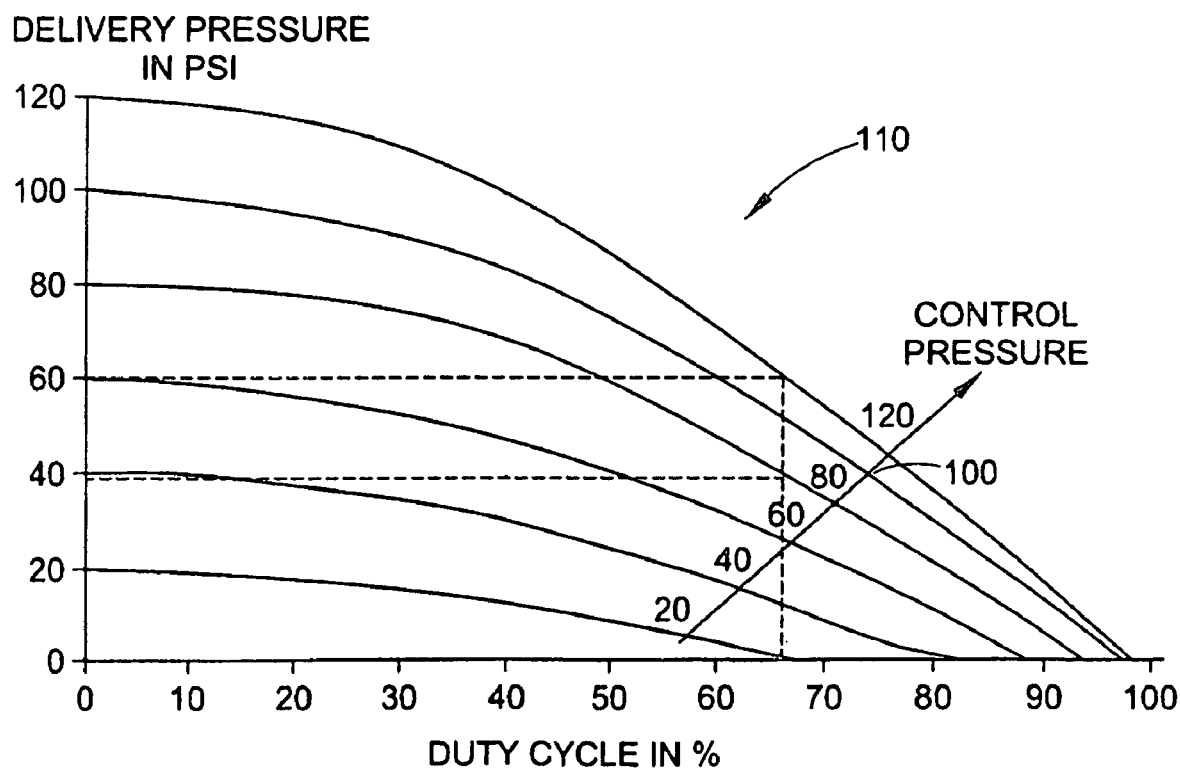
FIG. 3 illustrates experimental data showing a correlation of a duty cycle ratio to a delivery pressure for different variable control pressure values.

With reference to FIGS. 1 and 3, a graph 110 depicts the duty cycle ratio $\Phi$ (x-axis) to a dedicated delivery pressure (y-axis) in dependency to the variable control pressure. The diagram as shown is based mainly on experimental data. The duty cycle ratio in % is defined as $\Phi=(T_E/T_E+T_B)*100$ where $T_E$=Exhaust Time (solenoid 24 is energized for pressure release) and $T_B$=Build Time (solenoid 24 is not energized and pressure builds up). The frequency f of the duty cycle period is $f=1/T_E+T_B$ and is determined by the limit at the low end of a still acceptable ripple on delivery pressure and at the high end of the death or lifetime of the solenoid itself.

The reaction time and the hysteresis of the solenoid 24 and relay piston 50 also determine the low-end frequency. The frequency in the illustrated graph 110 is 25 Hz. A lower frequency provides a more wavelike delivery pressure and a higher frequency increases the number of solenoid activation's and, consequently, decreases the lifetime of the solenoid. However, it is to be understood that other solenoid and/or relay valve designs requiring different possible frequency ranges are also contemplated.

According to the graph 110, a desired pressure may be delivered to the delivery port 74 with a particular duty cycle ratio of the activation of the solenoid 24 for a given control pressure. The frequency in this case from switching on and of the solenoid 24 is constant and only the length (percentage) of energized phases (TE) to the length of not energizing phase ($T_B$) is varied.

As an example, the graph 110 illustrates that for a given control pressure of 80 psi a desired pressure of 39 psi is delivered with a 60% duty cycle ratio activation of the solenoid 24. In other words, 60% of the time $T_E+T_B$ the solenoid is energized (e.g., in the pressure release mode) and 40% of time $T_E+T_B$ the solenoid is not energized (e.g., pressure is building up). With the same duty cycle ratio of 60% a pressure of 60 psi is delivered with a 120-psi control pressure value.

Figure 4:
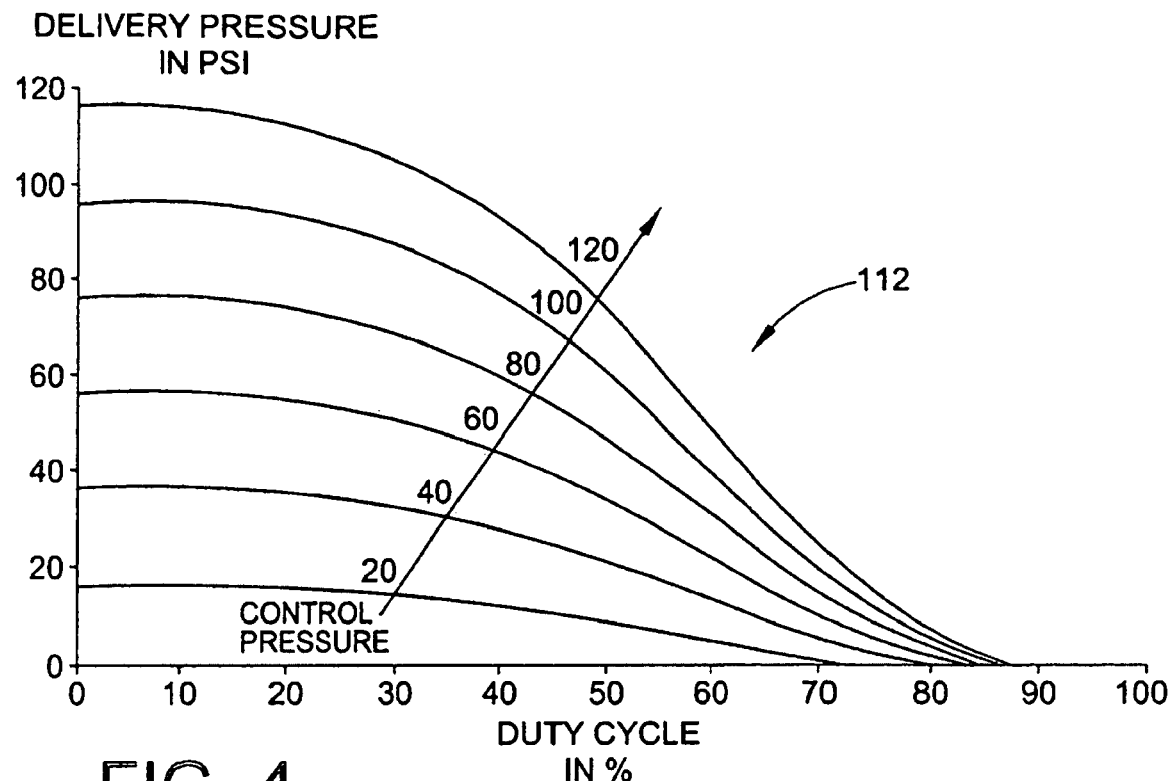
FIG. 4 illustrates a simple mathematical data model showing a correlation of a duty cycle ratio to a delivery pressure for different control pressure values.

Like the graph 110, a graph 112 shown in FIG. 4 depicts the duty cycle ratio $\Phi$ (x-axis) to a dedicated delivery pressure (y-axis) in dependency to the variable control pressure. However, while the graph 110 shown in FIG. 3 is based on experimental data, the graph 112 shown in FIG. 4 is based on a mathematical based program that considers the physical behavior of pressure build and release.

A simplified duty cycle data model is be derived from the following mathematical formulas:

The generalized pressure change rate is for increasing pressure:

$$\frac{dp}{dt} = K_b \sqrt{(P_c - p)} \text{ and } \frac{dp}{dt} = -K_e \sqrt{(p)}$$

for decreasing pressure. $K_B$ and $K_E$ are constants for modeling the restriction control inlet to control volume and control volume to atmosphere.

For small changes in time, the change in control volume pressure (p) may be approximated by first order expansion. For the nominal non-energized case, an increase for any control volume pressure p is:

$$\Delta p_B = \frac{dp}{dt}(p) * T_B$$

$$T_B = \text{Build Time}$$

For the energized case, the decrease in control volume pressure is:

$$\Delta p_E = \frac{dp}{dt}(p) * T_E$$

$$T_E = \text{Exhaust Time.}$$

Duty Cycle Selection

While pulse width modulating the solenoid, the duty cycle $\Phi$ is defined as $$\frac{T_E}{T_E + T_B}.$$

The average pressure within the control volume as a function of $\Phi$ can be found by solving for p since the steady state pressure level is the pressure where build and exhaust phases effectively cancel.

$$K_B \sqrt{(P_c - p)}(1 - \Phi) = K_E \sqrt{(p)}(\Phi)$$

$$\frac{p}{p_c} = \frac{K_B^2}{(K_E^2 \Phi^2 + K_B^2 (1 - \Phi)^2}$$

Comparing this characteristic to experimental data can determine the approximate ratio. Exact constants are not needed unless transient analysis is needed.

Period Selection

Selection of the PWM period, $T_E + T_B$, determines the amount of ripple seen in the control volume. Since $\Delta p_B = \Delta p_E$ at any steady state control volume pressure p, the peak to peak change is equal to $$\frac{dp}{dt}(p) * T_B = \frac{dp}{dt}(p) * T_E.$$

Increasing, the PWM period while maintaining the same duty cycle increases this ripple term until the first order expansion is no longer valid. Decreasing the PWM period shows that the ripple can be forced toward zero with the only physical limitation being the dead time of the solenoid itself.

Typically, the load volume controlled by the relay has a significantly slower dynamic response than the control volume since it is typically much larger. Therefore, the PWM period can be experimentally determined depending on the load pressure ripple requirements.

This simple mathematical model as shown in FIG. 4 proves to be consistant with the experimental data as shown in FIG. 3. The model in FIG. 4 does show some discrepancies at the high end of the duty cycle axis. However, these differences can be attributed to approaching the solenoid response bandwidth as energized time is minimized or maximized.

FIGS. 3 and 4 depict the delivery pressure is a function of the duty cycle ratio and the control pressure. However, the control pressure as delivered from the driver operated brake valve is not always known. For example, the control as the drivers request by applying the foot operated brake valve is unknown during normal braking and also during an ABS event. This handicap may be eliminated with the use of a pressure-estimation-program 120, which is illustrated in FIG. 5.

The pressure estimation program 120 is active only during an ABS event when the brake pressure needs to be adjusted by the solenoid controlled relay valve 14. The program calculates the build-up target pressure for the subsequent wheel speed cycle of each individual ABS controlled wheel. If the actual pressure in the following wheel speed cycle is different from the previous estimated target pressure, the program makes adjustments for the next wheel speed cycle. With this method of pressure estimation, the unknown control pressure value is automatically taken into consideration.

Figure 5:
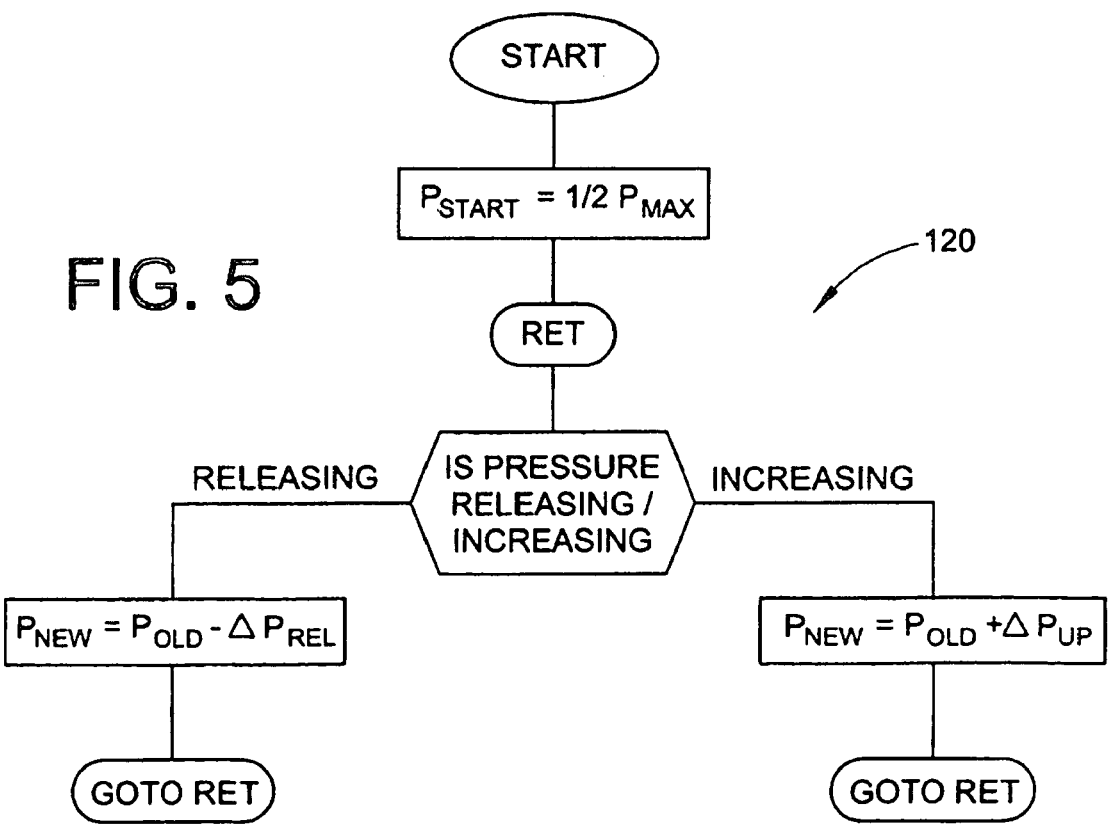
FIG. 5 illustrates a flow chart of an operation of a pressure estimation program in one embodiment of the present invention.

As depicted in the flow chart diagram 120 in FIG. 5, the pressure estimation program starts with a pressure demand ($p_{start}$) as half of the maximal possible brake pressure ($p_{max}$). $P_{max}$ is the air reservoir pressure level and typically approximately 120 psi. Since no information of the actual pressure level is available when the first solenoid is activated, starting with the first pressure estimation as half of the maximum pressure level is a compromise to find the right pressure level.

From the first release cycle associated with each electrical actuation command of the appropriate solenoid, a time adequate pressure level is subtracted when in release mode ($\Delta p_{rel}$) and added when in build up (increasing) mode ($\Delta p_{up}$) The $\Delta p$ value is calculated with a formula that considers the physical behavior of compressed air when released and subsequently rebuilt and includes the dependence of the pressure gradient to the pressure level and also the activation time of the solenoid controlled pressure modulator valves. Different $\Delta p$-factors are used for pressure release ($\Delta p_{rel}$) and for pressure increase ($\Delta p_{up}$).

The new estimated brake pressure level $p_{new}$ is increased ($p_{old} + p_{up}$) during the next pressure build-up phase if the actual brake pressure reached a higher level than estimated. The new estimated pressure level $p_{new}$ is decreased ($p_{old} - p_{rel}$) during the next pressure build-up phase if the actual brake pressure reached a lower level than estimated. The measurement reading for the correlation of the estimated pressure level to the actual pressure level is the actuation time of the solenoid. The solenoid actuation time is counted in each wheel cycle for pressure release and for pressure build up.

The pressure approximation method illustrated in FIG. 5 allows a relative accurate estimation of the instantaneous pressure level during an ABS event.

FIG. 6 shows a timing diagram 130 illustrating the advanced pressure control possibility and their appropriate wheel speed when the control model as described in one embodiment of the present invention operates the solenoid 132 in comparison to the two-solenoid control in the prior art 134.

The characteristic pressure control in an ABS event is to respond to an over braked wheel with a pressure release, waiting with a pressure hold when the wheel speed is recovering and build-up pressure again to achieve an optimal brake performance. With the time delay between control and delivery pressure and slow response of the relay piston, pressure control accuracy is limited when a relay valve is controlled with two solenoids. This disadvantage is substantially eliminated when the solenoid is operated with the control model in one embodiment of the present invention (especially during the hold and slow build-up pressure stages).

The solenoid control of the present invention can hold at every pressure level and can slowly build-up pressure without any pressure overshooting. This different pressure control behavior is based on the individual control target demand of both solenoid arrangements.

The control model in one embodiment of the present invention controls the solenoid pressure with targeting the delivery pressure value. The combined use of the pressure estimation program as described in FIG. 5 in conjunction with the duty cycle calculation program as described in FIG. 3 and/or FIG. 4 allows a desired brake pressure to be achieved as demanded.

The hatched area between the two pressure traces in FIG. 6 illustrates the difference between the two pressure control method in one embodiment of the present invention (dotted line) and the method of the prior art incorporating a plurality of solenoids (solid line).

The area a illustrates the difference when a hold stage is required at a lower pressure level. The two solenoid controlled relay valves will usually release the pressure completely. This is because the control pressure leads the delivery pressure. The control pressure may be fully exhausted while the delivery pressure is at the appropriate pressure value based upon the wheel speed behavior observed by the ECU. Once the control pressure is completely exhausted, the delivery pressure will continue to decrease until it is completely exhausted even if the ECU is demanding that the system hold at a given pressure. It is difficult to maintain a small pressure in the delivery after an exhaust has been commanded. Unlike the system with two solenoids, the single solenoid control is targeting a desired hold pressure value. As shown in the time period 90 in FIG. 2, the intermittently activated solenoid 24 with the appropriate duty cycle ratio overcomes and compensates the pressure delay between control and delivery pressure.

The same situation is true in the build pressure stages as shown in area b. To avoid overshooting the targeting delivery pressure value, the two solenoid controlled relay valves of the prior art can only approach the target pressure in a step by step fashion. Consequently, under braking may result in the beginning of the brake cycle and overbraking may result at the end of the brake cycle. The single solenoid with the quasi-linear characteristic of the duty cycle ratio to the delivery pressure, on the other hand, is capable of changing the grade of holding pressure from a steep grade to a flat grade in a smooth and constant manner by just changing the duty cycle in the appropriate manner.

The single solenoid, when operated with the control model in one embodiment of the present invention, produces a more accurate pressure control when compared to the prior art two-solenoid control. It also has the capability of providing more optimal control performance. The delivery pressure can be at the optimal pressure for a longer time during the control event.

As shown in FIG. 6 with the doted pressure line as marked with d, the flat build pressure grade with the single solenoid control is on a higher average level and extends against the two solenoid controlled pressure as shown with the solid line. With this extension, the appropriate wheel speed can be held longer in the best braking and best stability speed range (marked as e). Next to this performance enhancement, a lower control cycle frequency is achieved which also results in lower air consumption.

Figure 7:
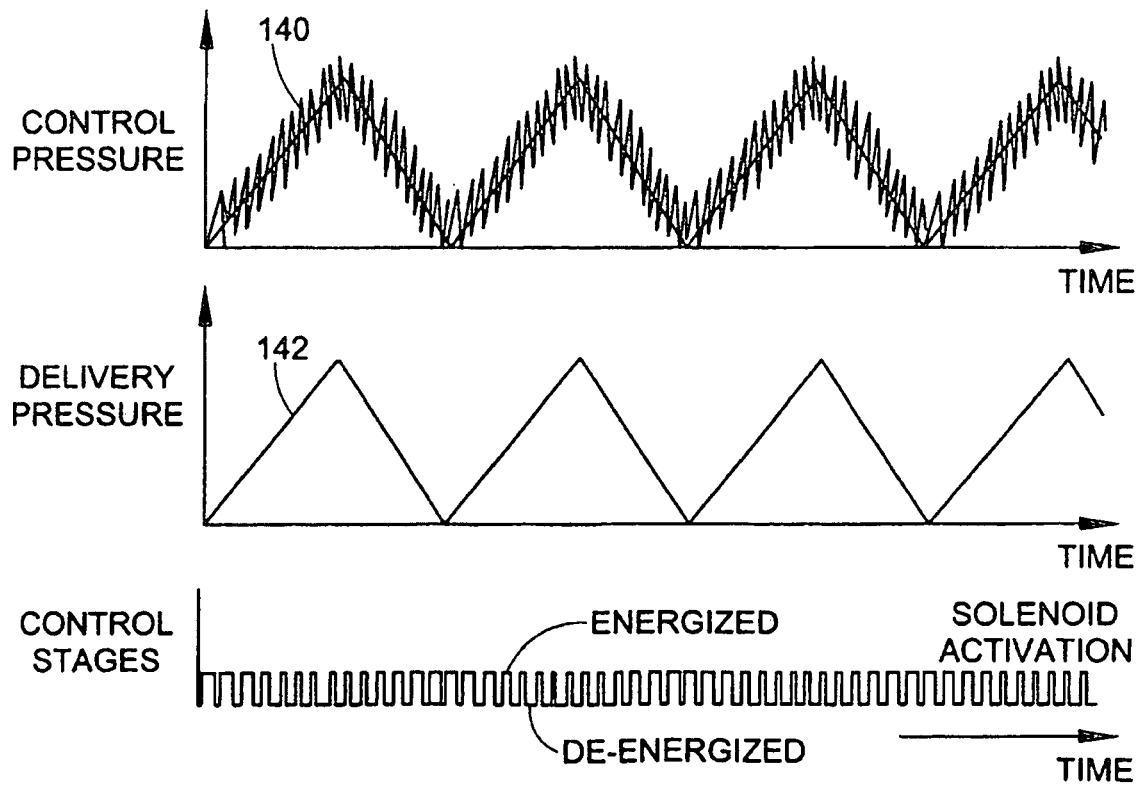
FIG. 7 illustrates a graph depicting a controllability of a 3/2-single solenoid controlled relay valve in conjunction with a control model in one embodiment of the present invention.

FIG. 7 depicts a control pressure graph 140 along with a graph 142 showing a saw tooth shaped delivery pressure, and a graph 144 showing the solenoid activation stages. The graphs 140, 142, 144 of FIG. 7 demonstrate the controllability of a single solenoid controlled relay valve as shown in FIG. 1. This practical example of the control model in one embodiment of the present invention can be used in an assembly line to bring production pieces in place.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept.

We claim:

1. An electronic control unit, comprising:
   a. a connector electrically communicating with a switching means, which is energized as a function of a control signal transmitted via the connector for controlling a pressurized fluid delivered to a pressure actuator via a relay valve; and
   b. a control model determined as a function of a hysteresis of the relay valve, the switching means being energized as a function of the control model.

2. The electronic control unit as set forth in claim 1, wherein a duty cycle of the switching means interacts with the hysteresis of the relay valve for holding the relay valve in a substantially fixed position, the pressurized fluid in the actuator being controlled as a function of a movement of the relay valve.

3. The electronic control unit as set forth in claim 2, wherein the control model causes the switching means to be activated according to a predetermined duty cycle for holding the pressurized fluid in the actuator.

4. The electronic control unit as set forth in claim 2, wherein the position of the relay valve is also determined as a function of a control pressure, which is set as a function of a brake pedal in a vehicle.

5. The electronic control unit as set forth in claim 1, wherein the control model is determined as a function of a control pressure on the relay valve.

6. The electronic control unit as set forth in claim 1, wherein the control model controls activation of the switching means during an ABS event.

7. An electronic control unit, comprising:
   a. at least two inputs for receiving signals indicative of wheel speed;
   b. an ABS controller for receiving the signals indicative of wheel speed for determining wheel slip;
   c. a control model in the ABS controller for generating a pulse width modulated control signal, a duty cycle of the pulse width modulated control signal generated in response to
      i. a target delivery pressure value for an associated solenoid controlled relay valve,
      ii. a hysteresis profile of the associated solenoid controlled relay valve, and
      iii. the wheel slip; and
   d. an output for communicating the pulse width modulated control signal.

8. The electronic control unit as in claim 7, wherein the duty cycle of the pulse width modulated control signal is varied inversely with respect to the target delivery pressure value of the associated solenoid controlled relay valve.

9. The electronic control unit as in claim 7, wherein the associated solenoid controlled relay valve is in at least one of a build state, a hold state and an exhaust state in response to the pulse width modulated control signal.

10. The electronic control unit as in claim 7 wherein the pulse width modulated control signal has a frequency value selected to increase a lifetime of the associated solenoid controlled relay valve and reduce a ripple on an actual delivery pressure from the associated solenoid controlled relay valve.

11. The electronic control unit as in claim 10 wherein the frequency value of the pulse width modulated control signal is 25 Hz.

12. An electronic control unit comprising:
 a. an input for receiving wheel speed signals from at least two wheels;
 b. means for determining wheel slip at the at least two wheels in response to the wheel speed signals;
 c. means for generating a pulse width modulated control signal, a duty cycle of the pulse width modulated control signal generated in response to;
  i. a target delivery pressure value,
  ii. a hysteresis profile of an associated solenoid controlled relay valve, and
  iii. the wheel slip; and
 d. an output for communicating the pulse width modulated control signal to the associated solenoid controlled relay valve.

13. The electronic control unit as in claim 12 wherein the duty cycle of the pulse width modulated control signal is varied inversely with respect to the target delivery pressure value.

14. The electronic control unit as in claim 12 further comprising generating the pulse width modulated control signal in response to a control pressure at the associated solenoid controlled relay valve.

15. An electronic control unit comprising:
 a. an input for receiving a request to deliver pressurized air;
 b. means for generating a pulse width modulated control signal, a duty cycle of the pulse width modulated control signal generated in response to;
  i. a target delivery pressure value, and
  ii. a hysteresis profile of an associated solenoid controlled relay valve;
 c. an output for communicating the generated pulse width modulated control signal to the associated solenoid controlled relay valve, the associated solenoid controlled relay valve delivering the pressurized air in response to the generated pulse width modulated control signal.

16. The electronic control unit as in claim 15 further comprising generating the pulse width modulated control signal in response to a control pressure at the associated solenoid controlled relay valve.

17. The electronic control unit as in claim 15 wherein the pulse width modulated control signal is generated during an ABS event.

18. A method of controlling a delivery pressure comprising:
 a. receiving at least one signal indicative of wheel speed;
 b. determining wheel slip in response to the at least one signal indicative of wheel speed;
 c. generating a pulse width modulated control signal having a duty cycle determined in response to a target delivery pressure of an associated relay valve, a hysteresis profile of the associated relay valve and the wheel slip; and
 d. providing the pulse width modulated control signal to a solenoid operatively connected to the associated relay valve.

* * * * *